United States Patent [19]

Baer

[11] 4,310,854
[45] Jan. 12, 1982

[54] TELEVISION CAPTIONING SYSTEM

[75] Inventor: Ralph H. Baer, Manchester, N.H.

[73] Assignee: Sanders Associates, Inc., Nashua, N.H.

[21] Appl. No.: 69,483

[22] Filed: Aug. 24, 1979

[51] Int. Cl.³ .............................................. H04N 7/04
[52] U.S. Cl. ................................................. 358/143
[58] Field of Search ............... 358/142, 143, 144, 145, 358/183, 198, 186, 149, 150, 154, 210, 281, 256, 257, 263, 280; 328/187

[56] References Cited

U.S. PATENT DOCUMENTS

| | | | |
|---|---|---|---|
| 3,046,329 | 7/1962 | Reesor | 358/198 |
| 3,221,098 | 11/1965 | Feldman et al. | 358/143 |
| 3,412,205 | 11/1968 | Saeger | 375/42 |
| 3,581,011 | 5/1971 | Ward et al. | 358/150 |
| 3,632,863 | 1/1972 | Hirashima | 358/142 |
| 3,816,658 | 6/1974 | Vidovic | 358/149 |

OTHER PUBLICATIONS

Radio Shack *Dictionary of Electronics*, 1974-1975 edition pp. 575 and 630.
Mohanty, "Simultaneous Transmission of Two Languages on Television", J. Instn. Telecom. Engrs. vol. 18, No. 7, 1972, pp. 313-319.
Heathkit Color TV Model GR-581, *Photofact*, vol. 138, Set 1373, Howard W. Sams & Co, 1975.

*Primary Examiner*—John C. Martin
*Attorney, Agent, or Firm*—Louis Etlinger; Richard I. Seligman

[57] ABSTRACT

Captioning of television presentations is achieved by transmitting digital data superimposed on the normal FM sound signal by modulation of an ultrasonic subcarrier and receiving the digital data at a viewer's television receiver by picking up the ultrasonic signal from the television receiver's loudspeaker; the received digital data being demodulated and applied to the television receiver as readable alphanumeric captions.

16 Claims, 5 Drawing Figures

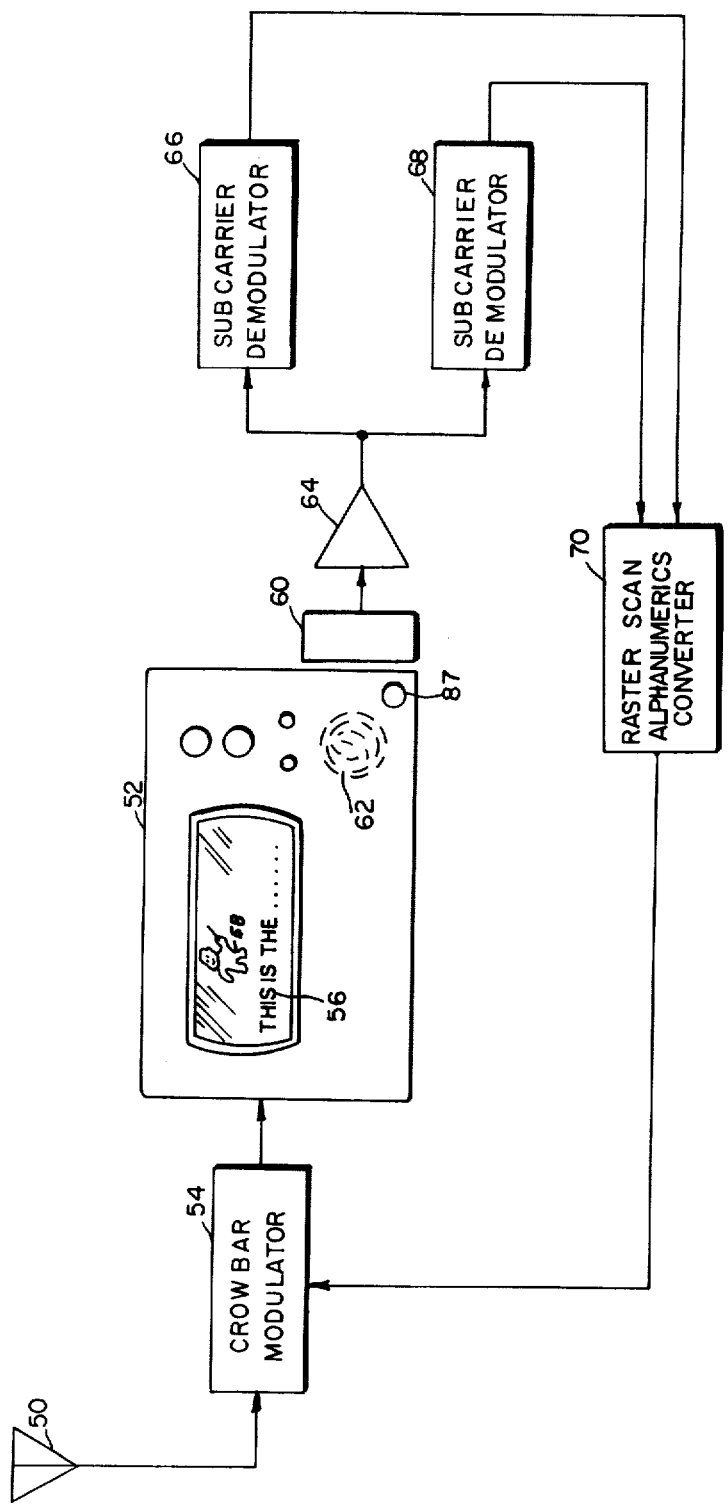

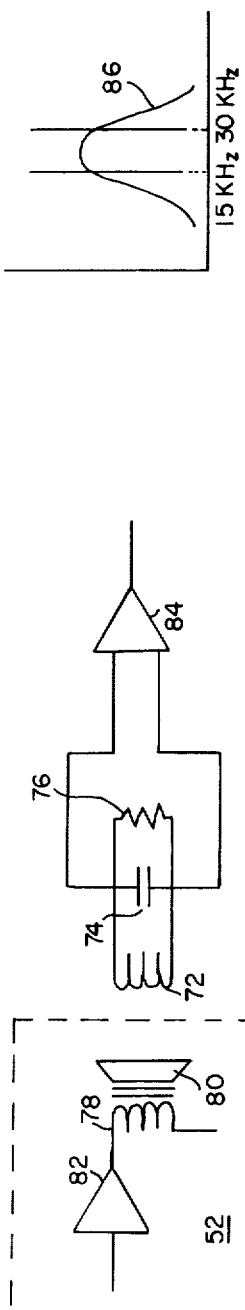
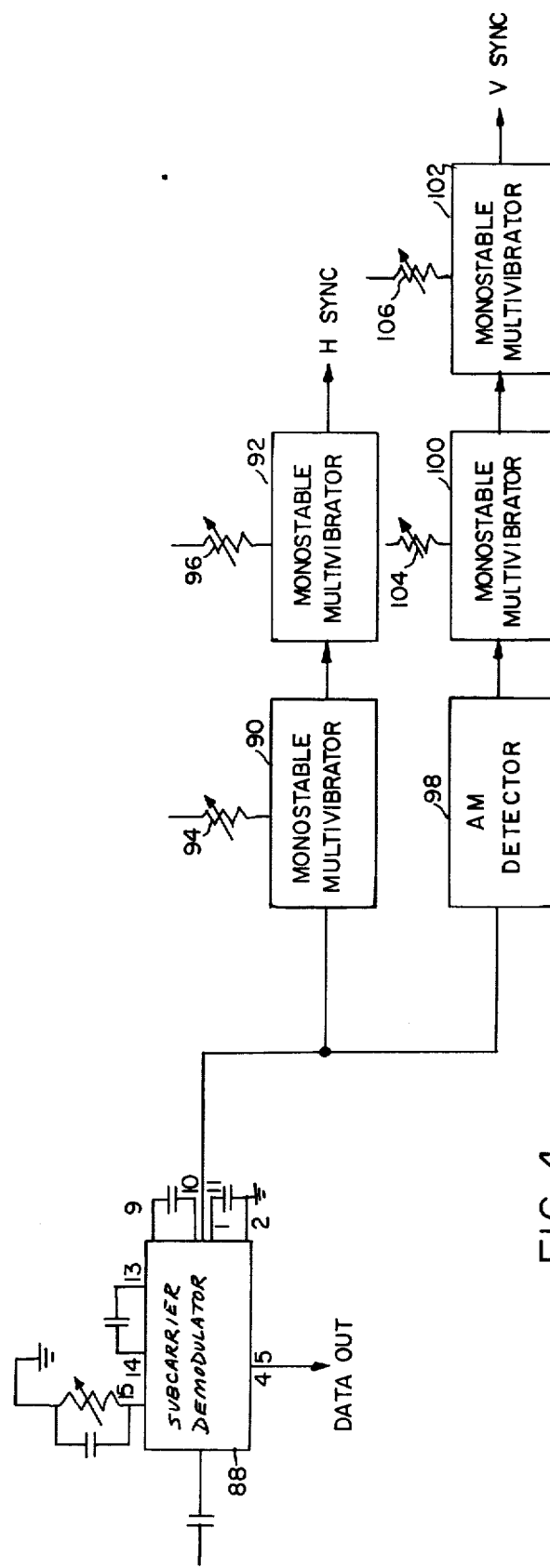

TELEVISION CAPTIONING SYSTEM

BACKGROUND OF THE INVENTION

Presently, television receivers are being developed in the United States and elsewhere which can extract digital data nested in vertical interval. The uses of such data in a home viewing environment include their extraction and resultant display on the picture tube of news, weather, stock market items and the like.

In addition to these development efforts, there are other related developments underway to allow captioning of TV programs; in particular such captioning is useful to the deaf viewer or to a viewer who may have need of an alternate language than that being used by the performers on screen. These captioning systems require either special television receivers equipped with circuits for the vertical interval system previously referred to or may make use of an accessory unit to a standard television receiver. This accessory unit generally consists of an entire television receiver RF/IF/detector section so as to gain access to the demodulated video signals of the station being used. This is relatively expensive.

Accordingly, it is an object of this invention to provide improved means for the captioning of television programs.

It is another object of this invention to provide improved means for the captioning of television programs where such programs are received on standard television receivers and without making connections to the internal circuitry of the television receiver other than those reached through the antenna terminals.

It is a further object of this invention to provide means for the extraction of digital data telecast by a program origination source without making connections to the internal circuitry of the television receiver.

It is yet another object of this invention to provide means for the extraction of synchronization pulses related in phase to those being received by a television receiver so as to make these pulses available as a surrogate synchronization source in lieu of making connection to the internal circuitry of the television receiver.

SUMMARY OF THE INVENTION

Captioning of a television presentation is achieved by having the program origination source generate digital data representing the captioned material superimposed on the transmitted FM sound signal by means of an ultrasonic subcarrier carrying the data in the form of an AM, FM or FSK modulation. The viewer's television receiver is supplemented by an additional unit capable of picking up such ultrasonic signal from the loudspeaker of the television receiver by virtue of a pickup coil broadly resonant at the ultrasonic frequency and placed in proximity to the television receiver loudspeaker's voice coil such as to couple out a portion of its flux field.

The data is communicated via the loudspeaker, even though neither the voice coil nor the attached cone moves sufficiently, if at all, to produce an acoustic output; the latter, if there were any, would be inaudible in any event. Signal processing of the extracted data subcarrier and of a synchronization pulse subcarrier can then take place.

To produce captions the data is stored, reformatted and employed to cause a raster scan organized dot matrix character generator to recreate the television message in conventional fashion. The resultant video signal is then applied to a crowbar modulator connected to the antenna terminals of the television receiver being used so as to overlay the caption material on the pictorial presentation from the program origination source.

The above-mentioned and other features and objects of this invention will become more apparent by reference to the following description taken in conjunction with the accompanying drawings, in which:

FIG. 2 is a system block diagram of a television captioning receiving system;

FIG. 3A is a schematic diagram of a pickup used to extract digital data and synchronization pulses from a television receiver;

FIG. 3B is a diagram illustrating the response of the pickup of FIG. 3A; and

FIG. 4 is a block diagram of a demodulator employed in the system of FIG. 2.

DESCRIPTION OF A PREFERRED EMBODIMENT

Figure 1:
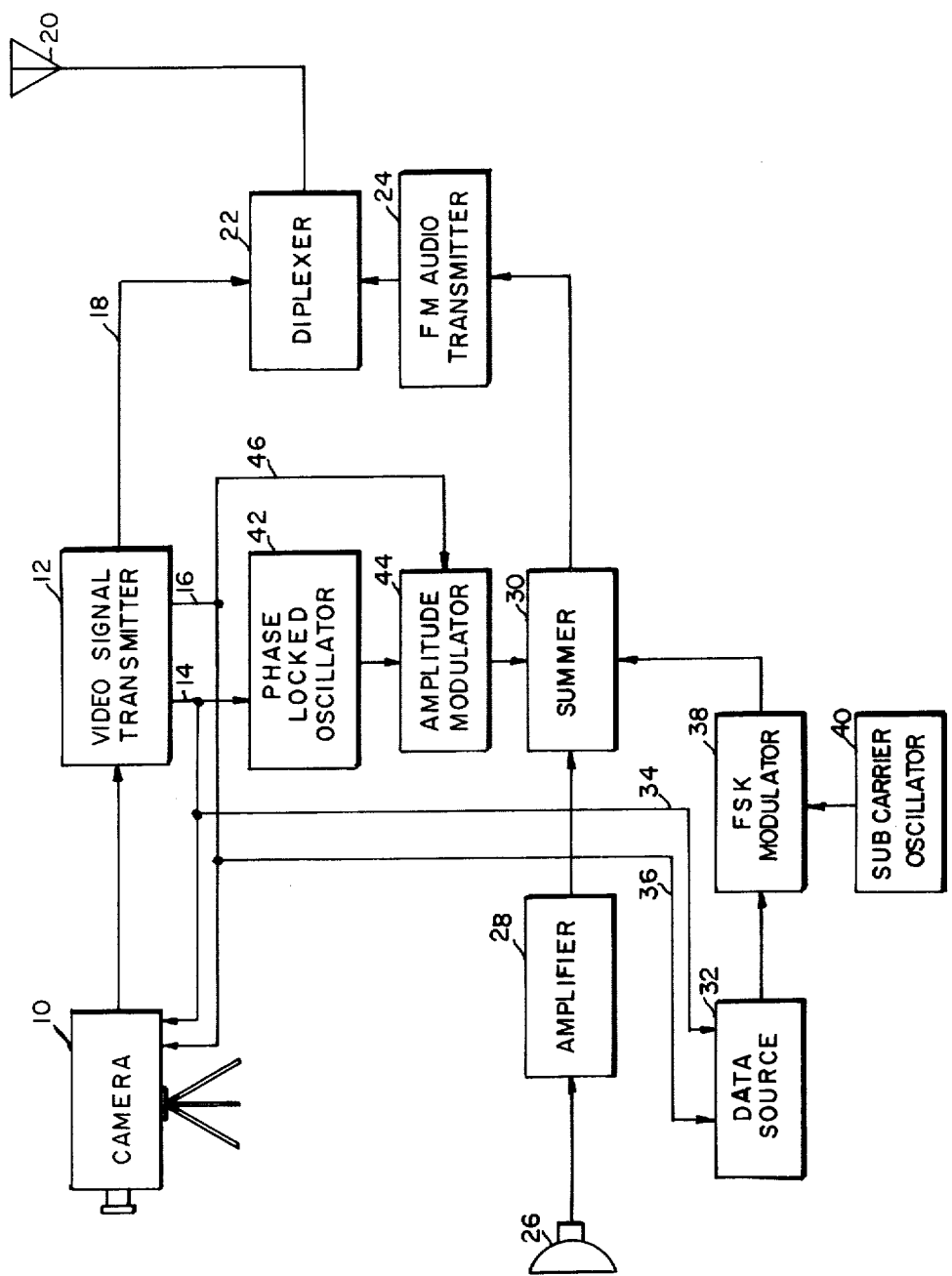
FIG. 1 is a system block diagram of a television captioning data transmission system.

Referring now to FIG. 1 of the drawings, there is illustrated thereby an embodiment of a television captioning data transmission system. This figure is a representation of an elementary television broadcast system capable of additionally transmitting digital data representative of captioned information to be reconstructed by television receivers tuned to the television station. In the figure, camera 10 represents a source of video information to be transmitted by the television station for television programming. The output of camera 10 is applied to a video transmitter 12. In addition, the video transmitter 12 also provides horizontal and vertical synchronization signals via lines 14 and 16 to camera 10. The signal generated by transmitter 12 at output 18 is a modulated rf carrier and is applied to an antenna 20 via a diplexer 22 for broadcast to those television receivers tuned to the appropriate frequency. It is well known that instead of broadcasting signals via antenna 20 they may be transmitted by other means, as for example, a coaxial cable.

The second input to diplexer 22 is from an FM audio transmitter 24 which normally transmits the sound which accompanies the video presentation. According to the teachings of this invention, FM audio transmitter 24 is also used to transmit the digital data representing the captioned information which is also to be transmitted to viewers.

The audio (audible voice) portion of the information to be transmitted by the television system is generated by, for example, a microphone 26, the output from which is applied to the FM audio transmitter 24 via an amplifier 28 and summer 30. The function of summer 30 is to sum the audio signals with the signals representing the data to be transmitted for captioning purposes and information related to the horizontal and vertical synchronization signals which are necessary for synchronizing the data with the televised program in order to permit proper synchronization of the data with the program at a receiver.

Captioning information is entered by a data source 32 which also receives horizontal and vertical synchronization signals from video transmitter 12 via lines 34 and 36. Data source 32 is typically a computer keyboard or a paper or magnetic tape reader capable of creating a digital bit stream of ones and zeros. The output from the data source 32 is applied to a modulator 38, typically, a frequency shift keyed (FSK) modulator. FSK modulator 38 is also excited by a signal from a subcarrier oscillator 40. Typically, subcarrier oscillator 40 is run at twice the horizontal line rate or 2×15,734=31,468 Hz. (for U.S. television systems). A zero would then be typically represented by a frequency shift keyed in to reduce that resting frequency to 14,734 Hz., and a one would be implemented by FSKing upward to typically 16,734 Hz. The output from modulator 38 is applied to summer 30 where it is added to the microphone generated sound signal and applied to FM audio transmitter 24.

Additionally, the horizontal synchronization signals from video transmitter 12 are applied to a phase locked oscillator 42, the output from which is applied to an amplitude modulator 44. In the AM modulator 44 the phase locked oscillator output signals are modulated by vertical synchronization signals from the video signals transmitter 12 which are applied to the amplitude modulator 44 via line 46. The output of modulator 44 is also applied to summer 30.

The signals generated and transmitted by the system of FIG. 1 are received by viewers, tuned to the frequency of the transmitter station, at an antenna 50 (see FIG. 2). Alternatively, of course, if the signals were not broadcast, but rather sent via a cable, then the input to the receivers would be a cable input as is well known in the art. Signals received from the broadcast station are applied to a television receiver 52 which is a standard home type television receiver. The signals are applied to the television receiver via a crowbar modulator 54. The purpose of the crowbar modulator is to produce white horizontal line segments (on areas of the received picture) which are so timed as to reconstruct the captioned message transmitted by the system of FIG. 1. This is illustrated in FIG. 2 by the alphanumerics 56 overlaid on the pictorial information which includes the figure 58.

The data and synchronization signals which are necessary to provide the captioning are received at a pickup device 60 which is positioned in close proximity to the loudspeaker 62 of the television receiver 52. The output from pickup device 60 is amplified by an amplifier 64 and then applied to a pair of subcarrier demodulators 66 and 68. Demodulator 66 is typically tuned to 15,734 Hz. and demodulator 68 is typically tuned to 31,468 Hz. The output of subcarrier demodulator 66 consists of horizontal and vertical synchronization pulses and the output of subcarrier demodulator 68 consists of the serial bit stream generated by data source 32 of FIG. 1. Thus, the output of these two demodulators provide both data and synchronization signals which may be processed into alphanumeric characters suitable for application to the crowbar modulator 54 and subsequent display of captions on the screen of the television receiver 52.

Data and synchronization signals are applied to a raster scan alphanumeric converter 70 which takes the data and synchronization signals and converts it to alphanumerics in suitable fashion for display on a raster scan receiver. The method of doing this is conventional, and integrated circuits are available from various manufacturers to accomplish this function.

The crowbar modulator is known and is shown in U.S. Pat. No. 4,117,511 as well as U.S. patent application Ser. No. 851,093 filed Nov. 14, 1977 for "Apparatus for Receiving Encoded Messages on the Screen of a Television Receiver and For Redisplay Thereof on the Same Receiver Screen in a Readable Format" now U.S. Pat. No. 4,186,413. The disclosure of this application is herein incorporated by reference.

Referring now to FIG. 3A of the drawings, there is illustrated apparatus for detecting the subcarrier signals. This apparatus includes an inductor 72, tuned and loaded by a capacitor 74 and a resistor 76, which is placed in close proximity to and preferably coaxial with the voice coil 78 of loudspeaker 80 in the television receiver 52 such that the subcarrier signals amplified by amplifier 82 will be coupled to the pickup coil 72. The output from the pickup is amplified by an amplifier 84. A typical response for the parallel resonant pickup circuit comprising inductor 72, capacitor 74 and resistor 76 is illustrated by curve 86 of FIG. 3B. Alternatively, when audio output connections are provided on the television receiver, for example, the typical earphone jack 87 (FIG. 2) of a small portable receiver, a direct connection can be made.

The subcarrier demodulators 66 and 68 are illustrated in FIG. 4 of the drawings. A standard FM stereo demodulator IC chip 88 is employed. The IC chip 88 illustrated is a National Semiconductor LM 1800. This device is intended to strip both a pilot subcarrier at 19 KHz. and a double sideband AM (L-R) sound signal centered on two times 19=38 KHz. Hence it provides all the attributes necessary for decoding the 15,734 Hz. horizontal synchronization related tone and the 2×15,734=31,468 Hz. data signal, both of which emerge directly from the IC device. The data signal output from subcarrier demodulator 88 is derived at either pin 4 or 5 of this particular IC chip and the horizontal synchronization signal related tone is derived at pin 11 of this particular IC chip.

The 15,734 Hz. signal at pin 11 is applied to a pair of successive monostable multivibrators 90 and 92 which provide the required delay and pulse width control to place the regenerated horizontal synchronization signal into the proper time/phase relationship with those of the picture being viewed on the television receiver. Controls 94 and 96 allow this relationship to be obtained. The control 94 is used to place the captioning on the desired place on the screen. The control 96 is used to obtain the proper pulse width. The output from monostable multivibrator 92 is the restored horizontal synchronization pulse.

The output of pin 11 is also applied to an AM detector 98 which strips off the amplitude modulation from the 15,734 Hz. carrier. The output from AM detector 98 is applied to another pair of successive monostable multivibrators 100 and 102 to reconstitute the properly timed vertical synchronization pulse which is derived at the output of monostable multivibrator 102. The controls 104, 106 are used for proper timing and phasing.

While the techniques described in this application have been directed to the use for a television captioning system to provide, for example, captioning for the deaf viewer or captioning of an alternative language from that being used by the performers on the screen, the invention is not limited thereto and has other applications. For example, the aforementioned U.S. patent application Ser. No. 851,093 discloses a message system wherein encoded data, displayed on a small area of a television screen, is received by a photosensitive pickup which responds to the encoded data. The system includes a message processor for storing viewer selected data and processing such data for redisplay on the television screen as readable alphanumerics such that messages not connected with general broadcast programs can be overlaid on the program as, for example, news bulletins or weather, stock market reports, etc. The system provided herein may be adapted in accordance with the teachings of said application and using the ultrasonic subcarrier as the source of the data instead of a light modulated spot on the television screen. Thus, it is to be understood that the embodiment shown is illustrative only and that many variations and modifications may be made without departing from the principles of the invention herein disclosed and defined by the appended claims.

I claim:

1. A television system for transmitting and receiving coded data which can be received by a viewer and displayed on the receiving television receiver as readable alphanumerics, comprising:
- a television transmitting system including a source of vertical and horizontal synchronization signals and an FM audio transmitter;
- a data source;
- means for generating a first ultrasonic subcarrier;
- first means for modulating said first ultrasonic subcarrier with the output from said data source;
- means for generating a second ultrasonic subcarrier;
- second means for modulating said second ultrasonic subcarrier with one of said synchronization signals;
- means for summing the outputs from said first and second modulating means;
- means for applying the output of said summing means to the FM audio transmitter;
- a television receiver for receiving said modulated first and second subcarriers;
- means coupled to said television receiver for receiving said modulated first and second subcarriers from said television receiver;
- means coupled to said receiving means for demodulating said first and second subcarriers; and
- means coupled to said demodulating means for converting the coded data to alphanumerics displayed on the screen of the television receiver.

2. Apparatus as defined in claim 1 wherein said first modulating means includes an FSK modulator.

3. Apparatus as defined in claim 1 wherein said means for generating a second ultrasonic carrier includes an oscillator phase locked to the horizontal synchronization signals.

4. Apparatus as defined in claim 3 wherein said oscillator has a frequency substantially equal to the rate of the horizontal synchronization signals.

5. Apparatus as defined in claim 4 wherein the said one of said synchronizing signals is the vertical synchronizing signal.

6. Apparatus as defined in claim 5 wherein said first modulating means includes an AM modulator.

7. Apparatus as defined in claim 1 wherein said receiving means includes means proximate the loudspeaker of said television receiver responsive to the flux field about the loudspeaker's voice coil.

8. Apparatus as defined in claim 7 wherein said means responsive includes an inductor.

9. Apparatus as defined in claim 1 wherein said television receiver includes an audio output jack, said receiving means including means coupled to said audio output jack.

10. Apparatus as defined in claim 1 wherein said converting means includes means for converting the coded data to signals suitable to generate alphanumerics on the screen of the television receiver and means for applying the alphanumerics to the television receiver to overlay an ongoing program.

11. Apparatus as defined in claim 10 wherein said applying means includes a crowbar modulator.

12. Apparatus for receiving data via a television receiver loudspeaker which was transmitted by means of a modulated ultrasonic subcarrier superimposed on the television FM sound signal, comprising:
- means proximate the television receiver loud speaker responsive to the flux field about the loudspeaker's voice coil; and
- means coupled to said means responsive for demodulating the output thereof.

13. Apparatus as defined in claim 12 wherein said means responsive includes an inductor.

14. Apparatus as defined in claim 13 wherein said means responsive further includes a capacitor and a resistor parallel with said inductor, said inductor capacitor and resistor being tuned to said ultrasonic subcarrier.

15. Television transmitting apparatus, including means for generating vertical and horizontal synchronization signals, for transmitting a first distinct signal and a second distinct signal, including the television vertical synchronization signals, along with the normal audio information, comprising:
- a first ultrasonic subcarrier oscillator;
- means for modulating the output of said first oscillator with the first distinct signal;
- a second ultrasonic subcarrier oscillator; said second oscillator being phase locked to the horizontal synchronization signals;
- means for modulating the output of said second oscillator with said vertical synchronization signals; and
- means for combining the outputs from said modulating means with the normal audio information.

16. Apparatus as defined in claim 15 wherein said means for modulating includes an amplitude modulator.

* * * * *